US009021229B2

(12) United States Patent
Ananthanarayanan et al.

(10) Patent No.: US 9,021,229 B2
(45) Date of Patent: Apr. 28, 2015

(54) OPTIMIZING A FILE SYSTEM FOR DIFFERENT TYPES OF APPLICATIONS IN A COMPUTE CLUSTER USING DYNAMIC BLOCK SIZE GRANULARITY

(75) Inventors: Rajagopal Ananthanarayanan, San Jose, CA (US); Karan Gupta, San Jose, CA (US); Prashant Pandey, San Jose, CA (US); Himabindu Pucha, San Jose, CA (US); Prasenjit Sarkar, San Jose, CA (US); Mansi Ajit Shah, Sunnyvale, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 12/760,476

(22) Filed: Apr. 14, 2010

(65) Prior Publication Data

US 2011/0258378 A1 Oct. 20, 2011

(51) Int. Cl.
*G06F 3/06* (2006.01)

(52) U.S. Cl.
CPC .............. *G06F 3/0643* (2013.01); *G06F 3/061* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 5,442,752 A | 8/1995 | Styczinski | |
| 5,526,504 A * | 6/1996 | Hsu et al. ...................... | 711/207 |
| 5,678,024 A | 10/1997 | Wagar et al. | |
| 7,076,553 B2 | 7/2006 | Chan et al. | |
| 2002/0062454 A1 * | 5/2002 | Fung ............................... | 713/300 |
| 2005/0039049 A1 * | 2/2005 | Chang et al. .................... | 713/201 |
| 2006/0149915 A1 * | 7/2006 | Maly .............................. | 711/172 |
| 2007/0260842 A1 * | 11/2007 | Faibish et al. ................. | 711/170 |
| 2008/0120462 A1 * | 5/2008 | Nehse ........................... | 711/114 |
| 2009/0089532 A1 * | 4/2009 | Wang et al. .................... | 711/170 |

(Continued)

FOREIGN PATENT DOCUMENTS

| | | |
|---|---|---|
| JP | H10214257 | 8/1998 |
| JP | H10283230 | 10/1998 |

(Continued)

OTHER PUBLICATIONS

B. Gonzalez and G. Thiruvathukal, "The Hydra Filesystem: A Distrbuted Storage Famework," in Linux Clusters International, 2006.*

(Continued)

*Primary Examiner* — Edward Dudek, Jr.
*Assistant Examiner* — Ralph A Verderamo, III
(74) *Attorney, Agent, or Firm* — Mohammed Kashef

(57) ABSTRACT

Embodiments of the invention relate to optimizing a file system for different types of applications in a compute cluster using dynamic block size granularity. An exemplary embodiment includes reserving a predetermined number of storage allocation regions for each node in a cluster, wherein each storage allocation region comprises a set of contiguous data blocks on a single storage disk of locally attached storage; using a contiguous set of data blocks on a single storage disk of locally attached storage as a file system's block allocation granularity for striping data to be stored in the file system for a compute operation in the cluster; and using a single data block of a shared storage subsystem as the file system's block allocation granularity for striping data to be stored in the file system for a data access operation in the cluster.

20 Claims, 5 Drawing Sheets

(56) References Cited

U.S. PATENT DOCUMENTS

2009/0287675 A1* 11/2009 Dorrell et al. .................... 707/5
2012/0249564 A1* 10/2012 Liu et al. ...................... 345/522

FOREIGN PATENT DOCUMENTS

| JP | 2002132548 | 5/2002 |
| JP | 2002132548 A | 5/2002 |
| JP | 2004199535 | 7/2004 |
| JP | 2004199535 A | 7/2004 |
| JP | 2006294052 | 10/2006 |
| JP | 2006294052 A | 10/2006 |
| JP | 2007328727 | 12/2007 |
| JP | 2007328727 A | 12/2007 |
| WO | 96/25801 | 8/1996 |
| WO | 2007/089502 A1 | 8/2007 |

OTHER PUBLICATIONS

HDFS Architecture. hadoop [online], Apr. 2009 [retrieved on Jun. 22, 2012]. Retrieved from the Internet< URL: http://hadoop.apache.org/common/docs/r0.20.0/hdfs_design.html#Data+Replication>.*

Otto, E. et al., "Optimal File-Bundle Caching Algorithms for Data-Grids", Proceedings of the 2004 ACM/IEEE Conference on Supercomputing, Mar. 2004, 11 pages.

Rodriguez, P. et al., "Dynamic Parallel Access to Replicated Content in the Internet", IEEE ACM Transactions on Networking, vol. 10, No. 4, Aug. 2002, pp. 455-465.

Dean, J. et al., "MapReduce: Simplified Data Processing on Large Clusters", Communications of the ACM, Jan. 2008, vol. 51, No. 1, pp. 107-113.

Ghemawat, S. et al., "The Google File System", ACM SOSP, Oct. 2003, pp. 29-43.

Schmuck, F. et al., "GPFS: A Shared-Disk File System for Large Computing Clusters", Proc. of the FAST 2002 Conference on File and Storage Technologies, Monterey, California, Jan. 2002, pp. 231-244.

Tantisiriroj, W. et al., "Crossing the Chasm: Sneaking a Parallel File System into Hadoop", SC08 Petascale Data Storage Workshop, 2008. 1 page.

Bogdan Nicolae et al., "BlobSeer: Bringing High Throughput under Heavy Concurrency to Hadoop Map-Reduce Applications" IEEE Conference Paper Digital Object Identifier: 10.1109/IPDPS.2010.5470433, Publication Year: 2010, pp. 1-11.

* cited by examiner

OPTIMIZING A FILE SYSTEM FOR DIFFERENT TYPES OF APPLICATIONS IN A COMPUTE CLUSTER USING DYNAMIC BLOCK SIZE GRANULARITY

FIELD OF THE INVENTION

Embodiments of the invention relate to the field of data storage, and in particular, to optimizing a file system for different types of applications in a compute cluster using dynamic block size granularity.

BACKGROUND

A file system is a method for storing and organizing files and data. File systems use storage subsystems to maintain files and data. File systems are management structures that impose a logical structure on a storage subsystem to allow client computers to create, store and access files of data on the storage subsystem. A Distributed File System is a file system that supports sharing of files and storage resources for multiple clients over a network. A cluster file system is a type of distributed file system that allows multiple compute nodes of in a cluster to simultaneously access the same data stored on a shared storage subsystem.

A compute cluster is a system with multiple nodes that interact with each other to provide a client system(s) with data, applications, and other system resources as a single entity. Compute clusters provide scalability and reliability by allowing nodes and shared storage to be added to the cluster. File systems are used to manage storage of data within the compute cluster. Storage is allocated by a file system in a compute cluster by assignment of particular areas of storage to data to be stored. Compute nodes in cluster view a file system as a local resource with direct access to the cluster file system's shared storage subsystem.

Cloud computing is a computing model providing a client(s) with remote virtualized computing resources as a service. Cloud computing provides software and hardware resources to a client(s) by hosting and delivering resources as services remotely and on demand over a network. End-users are thereby enabled to exploit compute resources, on demand, without investment in infrastructure and management. Underlying architecture for cloud computing typically comprises large distributed clusters of servers that work in concert.

BRIEF SUMMARY

Embodiments of the invention relate to optimizing a file system for different types of applications in a compute cluster using dynamic block size granularity. An aspect of the invention includes a method for optimizing a file system for different types of applications in a compute cluster using dynamic block size granularity. The method may include, reserving a predetermined number of storage allocation regions for each node in a cluster, wherein each storage allocation region comprises a set of contiguous data blocks on a single storage disk of locally attached storage; using a contiguous set of data blocks on a single storage disk of locally attached storage as a file system's block allocation granularity for striping data to be stored in the file system for a compute operation in the cluster; and using a single data block of a shared storage subsystem as the file system's block allocation granularity for striping data to be stored in the file system for a data access operation in the cluster.

Another aspect of the invention includes a system for optimizing a file system for different types of applications in a compute cluster using dynamic block size granularity. The system may include a compute cluster, the compute cluster comprising: a plurality of nodes, wherein each of the plurality of node comprises locally attached storage, a shared storage subsystem coupled to each of the plurality of nodes, and a file system manager coupled to the shared storage subsystem and each of the plurality of nodes, wherein the file system manager: reserves a predetermined number of storage allocation regions for each of the plurality of nodes in the compute cluster, wherein each storage allocation region comprises a set of contiguous data blocks on a single storage disk of locally attached storage, uses a contiguous set of data blocks on a single storage disk of locally attached storage as a file system's block allocation granularity for striping data to be stored in the file system for a compute operation in the compute cluster, and uses a single data block of a shared storage subsystem as the file system's block allocation granularity for striping data to be stored in the file system for a data access operation in the compute cluster.

Another aspect of the invention includes a computer program product for optimizing a file system for different types of applications in a compute cluster using dynamic block size granularity, comprising: a computer readable storage medium having computer readable program code embodied therewith, the computer readable program code comprising: computer readable program code configured to reserve a predetermined number of storage allocation regions for each node in a cluster, wherein each storage allocation region comprises a set of contiguous data blocks on a single storage disk of locally attached storage, computer readable program code configured to use a contiguous set of data blocks on a single storage disk of locally attached storage as a file system's block allocation granularity for striping data to be stored in the file system for a compute operation in the cluster, and computer readable program code configured to use a single data block of a shared storage subsystem as the file system's block allocation granularity for striping data to be stored in the file system for a data access operation in the cluster.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1:
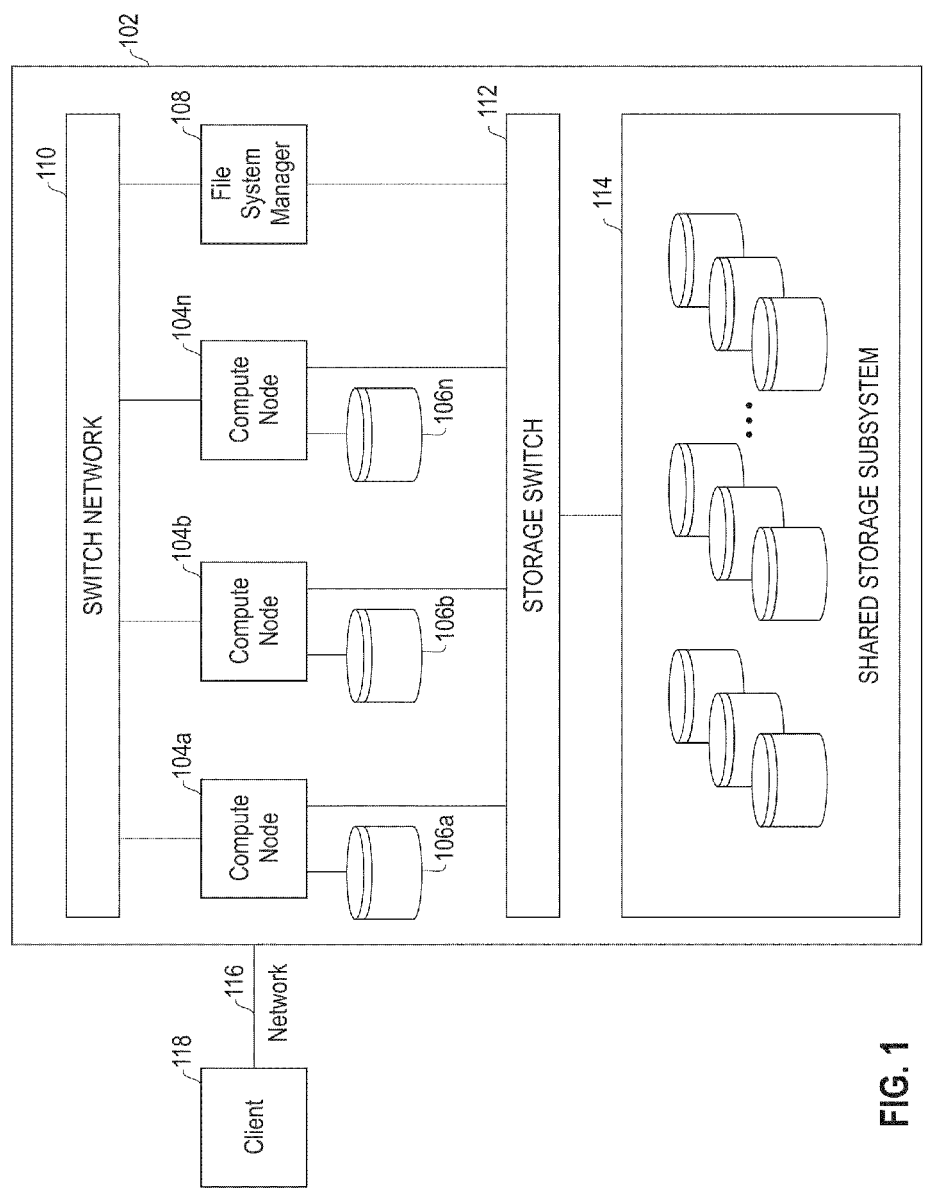
FIG. 1 illustrates a compute cluster with a file system optimized for different types of applications using dynamic block size granularity, according to one embodiment.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of optimizing a file system for different types of applications in a compute cluster using dynamic block size granularity, as well as operation and/or component parts thereof. While the following description will be described in terms of storage allocation processes and storage devices to place the invention in context on an exemplary embodiment, it should be kept in mind that the teachings, including the claims, herein may have broad application to other types of systems, devices and applications, including systems, devices and applications in cloud computing environments.

Embodiments of the invention relate to optimizing a file system for different types of applications in a compute cluster using dynamic block size granularity. Cluster file systems which use shared storage do not support shipment of computation to data, a feature needed to support data-intensive applications (e.g. data analytics applications) that process large data sets. In addition, the default block sizes for cluster file systems using shared storage are small which leads to a high task overhead for data intensive applications that schedule one task per data block. The underlying storage architecture to run data intensive applications is based on Internet-scale file systems that do not provide a standard Portable Operating System Interface for Unix (POSIX) interface. Internet-scale file systems are specialized file systems suited for data intensive applications but do not support the performance requirements of traditional applications.

In one embodiment, modifications are presented to a file system's block allocation scheme to support traditional applications and data intensive applications in a single compute cluster. For example, a file system's data allocation is modified to allow for a POSIX storage stack to support cloud analytics built on traditional POSIX-based cluster file systems. In one embodiment, a file system of a compute cluster is enabled with a choice of large block granularity for data associated with compute operations for data intensive applications and small block granularity for data associated with data access operations for traditional applications. In an exemplary embodiment, the file system round-robin block allocation scheme is modified to use a contiguous set of blocks, large block, as the allocation granularity for striping data for a compute operation. In another exemplary embodiment, the file system uses the default block size granularity, small block size, internally for all data access operations used for traditional applications.

FIG. 1 illustrates a compute cluster with a file system optimized for different types of applications using dynamic block size granularity, according to one embodiment. The compute cluster 102 includes a plurality of compute nodes 104a, 104b . . . 104, also known as application nodes. In an exemplary embodiment, the compute cluster 102 includes hardware architecture that can scale to thousands of compute nodes 104a, 104b . . . 104n.

Each compute node 104a, 104b . . . 104n is coupled to locally attached storage 106a, 106b . . . 106n. For example, the locally attached storage 106a, 106b . . . 106n may be physically internal to a compute node 104a, 104b . . . 104n and/or physically external, directly attached using a disk array device. In one embodiment, the locally attached storage 106a, 106b . . . 106n includes a storage device directly attached to the compute nodes 104a, 104b . . . 104n through an interface standard. For example, interface standards include, but are not limited to, Fiber Channel (FC), Small Computer System Interface (SCSI) or Integrated Drive Electronics (IDE). In an exemplary embodiment, each compute node 104a, 104b . . . 104n includes four 750 Gigabyte (GB) Serial Advanced Technology Attachment (SATA) drives of locally attached storage 106a, 106b . . . 106n.

The compute cluster 102 includes a file system manager 108 configured to manage a file system of the compute cluster 102. For example, file systems of compute cluster 102 may include, but are not limited to, an IBM General Parallel File System™ (GPFS™). In an exemplary embodiment, the file system manager 108 is embodied in software and may be run from any standalone node in the compute cluster 102.

The compute cluster 102 further includes a shared storage subsystem 114. For example, the shared storage subsystem 114 may include, but is not limited to, a storage area network (SAN) device. The shared storage subsystem 114 is coupled to a storage switch 112. The compute nodes 104a, 104b . . . 106 are coupled to the storage switch 112 for access to the shared storage subsystem 114. The file system manager 108 is coupled to the storage switch 112 for managing the compute cluster's 102 file system using the shared storage subsystem 114. The shared storage subsystem 114 is configured to provide compute nodes 104a, 104b . . . 104n with concurrent access to the same data. The shared storage subsystem 114 enables the sharing of write bandwidth across compute nodes 104a, 104b . . . 104n. In one embodiment, the shared storage subsystem 114 is designed to use underlying data protection techniques to circumvent hardware failures. For example, the shared storage subsystem 114 may use Redundant Array of Inexpensive Disks (RAID) techniques to provide data protection.

The compute cluster 102 further includes a switch network 110. The switch network 110 is configured to provide interconnection for components within the file system. In one embodiment, the switch network 110 is configured to provide interconnection for the compute nodes 104a, 104b . . . 104n and the file system manager 108. In an exemplary embodiment, the switch network 110 is a gigabit ethernet switch for each node rack with a 1 gigabit per second (gbps) inter-switch link run with Linux software. In another embodiment, the switch network 110 is further configured to provide access a client node 118 over network 116. For example, network 116 includes, but is not limited to, a wide area network (WAN).

In one embodiment, the compute cluster 102 hosts data and computing services remotely for a client 118. For example, compute cluster 102 enables cloud computing services for hosting data and compute services at a data site for remote clients. In an exemplary embodiment, the compute cluster 102 is configured to host the running of data analytics applications and the storing of data associated for the data analytics applications remotely for a client(s) 118 over the network 116. Accordingly, compute cluster 102 enables parallelism and scalability in a cloud to run data intensive applications with large data sets. For example, data intensive applications include data analytics applications that decompose large compute tasks into a set of smaller parallelized computations.

Figure 2:
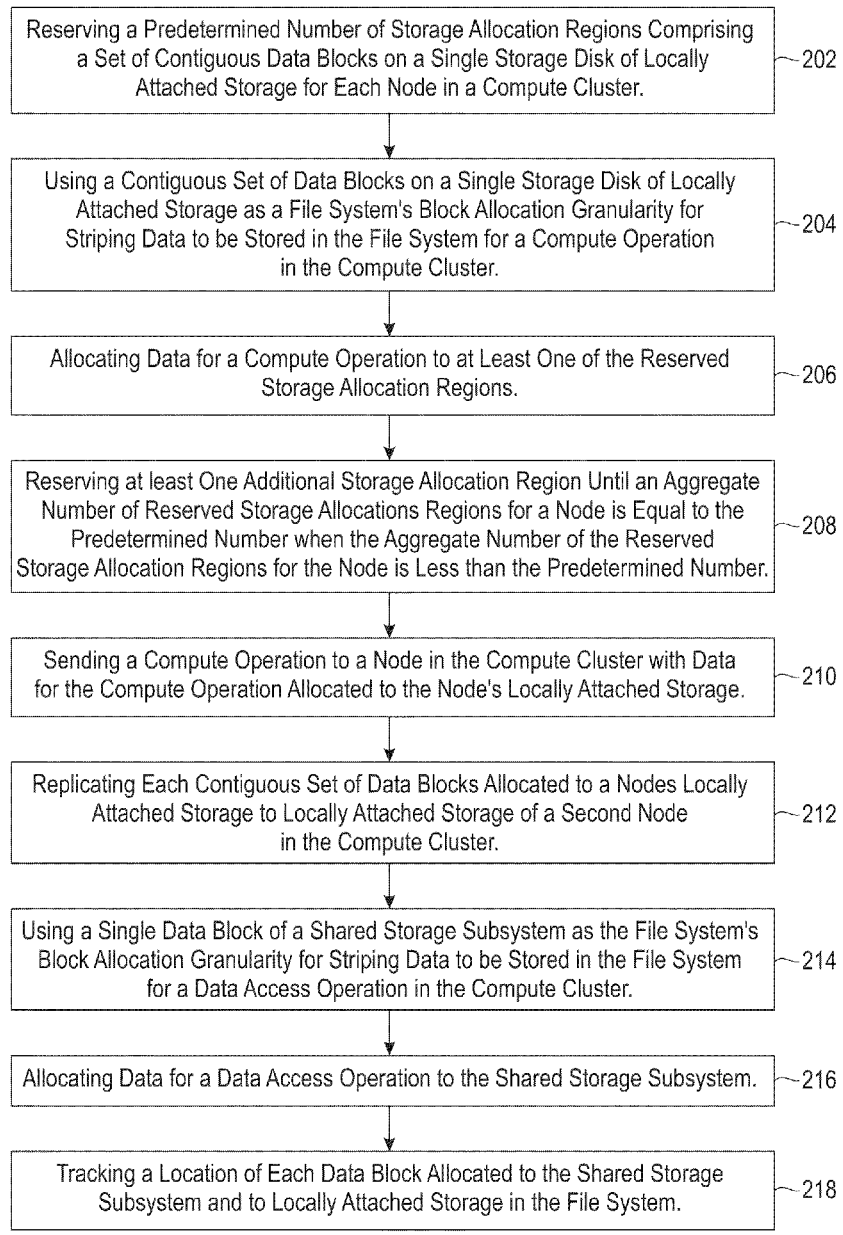
FIG. 2 illustrates a flow chart of a method for optimizing a file system for different types of applications in a compute cluster using dynamic block size granularity, according to one embodiment.

FIG. 2 illustrates a flow chart of a method 200 for optimizing a file system for different types of applications in a compute cluster using dynamic block size granularity, according to one embodiment. At 202, the file system manager 108 reserves a pre-determined number of storage allocation regions comprising a set of contiguous data blocks on a single storage disk of the locally-attached storage 106a, 106b . . . 106n for each compute node 104a, 104b . . . 104n in cluster 102. In one embodiment, the file system manager 108 pre-fetches a pool of contiguous storage allocation regions for each compute node 104a, 104b . . . 104n in the compute cluster 102 ahead of time. For example, pre-fetching a pool of contiguous storage allocation regions ahead of time prevents network latency and application performance effects. Accordingly, each compute node 104a, 104b . . . 104n will have ready a pool of contiguous storage allocations regions and will not incur network latency in the path of an input/output (I/O) request.

In an exemplary embodiment, the predetermined number of the reserved storage allocation regions for each compute node 104a, 104b . . . 104n in the compute cluster 102 is ten (10). For example, the file system pre-fetches a pool ten storage allocation regions comprising contiguous a set of data blocks for each compute node 104a, 104b . . . 104n in the compute cluster 102. In other embodiments, the predetermined number of storage allocation regions for each node 104a, 104b . . . 104n in the cluster 102 may range, but is not limited to, 5-200 storage allocation regions. The predetermined number of reserved storage allocation regions for each compute node 104a, 104b . . . 104n in the cluster 102 may range based on to the level of contiguity employed for data blocks, the type of applications being supported in the compute cluster 102, the file system employed, and the performance requirements of applications in the compute cluster 102.

At 204, the file system manager 108 uses a contiguous set of data blocks on a single storage disk of locally attached storage 106a, 106b . . . 106n as a file system's block allocation granularity for striping data to be stored in the file system for a compute operation from a compute node 104a, 104b . . . 104n in the compute cluster 102. In one embodiment, the file system manager 108 uses the contiguous set of data blocks on a single storage disk of locally attached storage 106a, 106b . . . 106n, large data blocks or large block size granularity, as the allocation granularity to allocate data to be stored for a compute operation from a compute node 104a, 104b . . . 104n in the compute cluster 102. For example, the file system manager 108 uses the large block size granularity to allocate data to be stored for a compute operation because small block sizes lead to a high task overhead for data intensive applications. Accordingly, the file system's data allocation and data layout information of compute cluster 102 is modified to use large block size granularity to support the requirements of data intensive applications.

The block size granularity of a single block may vary. The default block size of a single block may range depending performance requirements and tradeoffs and the file system employed. For example, the block size granularity of a single block may range, but is not limited to, from 8 KB to 16 MB. In an exemplary embodiment, the block size granularity of a single block is 1 MB. For example, data blocks of a 1 MB fixed size prevents fragmentation in a file system, maintains optimal sequential read and writes performance, and allows for node-level locality. In other exemplary embodiments, the block size granularity of a single block is 256 KB and 512 KB.

In one embodiment, the storage allocation regions for striping data to be stored in the file system for a compute operation are contiguous to a predetermined size. For example, the storage allocation regions for striping data to be stored in the file system for a compute operation may be contiguous from, but not limited to, 8 MB to 256 MB. In an exemplary embodiment, 64 1 MB blocks are grouped into a 64 MB storage allocation region for striping data to be stored in the file system for a compute operation. For example, the large block granularity for striping data to be stored in the file system for a compute operation is a 64 MB data block comprising 64 consecutive single 1 MB data blocks. In other embodiments, the block size granularity for striping data to be stored in the file system for a compute operation may vary depending on the file system employed and application performance requirements.

The file system manager 108 uses locally attached storage 106a, 106b . . . 106n of each compute node 104a, 104b . . . 104n in the compute cluster 102, rather than shared storage subsystem 114, for storing data for compute operations. For example, locally attached storage 106a, 106b . . . 106n is employed for storing data for compute operations because of the low cost of locally attached storage 106a, 106b and bandwidth limitations of the shared storage subsystem 114. For instance, the storage layer for data intensive applications is built on commodity components, locally attached storage 106a, 106b . . . 10n, to minimize storage costs, allow the compute cluster 102 to scalable to thousands of compute nodes 104a, 104b . . . 104n so that highly parallel applications can process large amounts of data. Furthermore, the storage layer for data intensive applications is built using locally attached storage 106a, 106b . . . 106n to efficiently support large files that are common in data intensive applications by being able to ship the compute operations to data rather than the data to the compute operations.

In an exemplary embodiment, compute nodes 104a, 104b . . . 104n run and support data-intensive class of applications from which compute operations are initiated. In one embodiment, data-intensive class of applications includes, but is not limited to, applications that decompose large computations into sets of smaller parallelizable computations. A common feature in data intensive applications is that they are parallel and their data access bandwidth requirements dominate other resource requirements. For example, data intensive applications support computation(s) being decomposed into smaller parallel computations over a partitioned data set using map and reduce functions over key/value pairs that can be parallelized and executed on a large compute nodes 104a, 104b . . . 104n in a compute cluster 102.

In an exemplary embodiment, the data intensive applications include cloud computing based analytics applications. For example, cloud computing based analytics applications include, but are not limited to, scientific applications that process vast amounts of continually changing data, including satellite image pattern matching applications, applications for discovering biological functions from genomic sequences, applications for astronomical data derived from telescope imagery, and brain patters using Magnetic resonance imaging (MRI) data. In another embodiment, the data intensive applications further include internet-scale data processing applications such as web search applications and data indexing and mining applications.

At 206, the file system manager 108 allocates data for a compute operation to at least one of the reserved storage allocation regions. In one embodiment, the file system manager 108 implements striping of data across the file system, where large files are divided into equal size blocks, and consecutive blocks are placed on different disks in a round-robin manner. In an exemplary embodiment, the file system stripes the contiguous set of data blocks across locally attached storage 106a, 106b . . . 106n in a round-robin manner using wide striping. For example, striping techniques include, but are not limited to, wide striping, narrow striping, and no striping.

At 208, the file system manager 108 reserves at least one additional storage allocation region until an aggregate number of reserved storage allocations regions for a compute node 104a, 104b . . . 104n is equal to a predetermined threshold when the aggregate number of the reserved storage allocation regions for the compute node 104a, 104b . . . 104n is less than the predetermined threshold. In one embodiment, the file system manager 108 reserves at least one additional storage allocation region comprising a set of contiguous data blocks on a single storage disk of locally attached storage 106a, 106b . . . 106n for a compute node 104a, 104b . . . 104n until an aggregate number of reserved storage allocations regions for the node 104a, 104b . . . 104n is equal to the pre-determined threshold. For example, the file system manager 108 reserves an additional storage allocation region comprising a contiguous set of data blocks for a compute node 104a, 104b . . . 104n in the compute cluster 102 when the cardinality of pool for the compute node 04a, 104b . . . 104n is less than 10.

At 210, the file system manager 108 sends a compute operation to a compute node 104a, 104b . . . 104n in the compute cluster 102 with data for the compute operation allocated to the compute node's 104a, 104b . . . 104n locally attached storage 106a, 106b . . . 106n. In one embodiment, compute operations and tasks are sent to the compute node 104a, 104b . . . 104n where data for compute operation resides. For example, shipping compute tasks to data reduces network overhead allowing computations to be processed quickly. In an exemplary embodiment, compute tasks are co-located with data in the file system by exposing block location information of the file system to applications using the file system's ioctl. Accordingly, the file system manager 108 uses the block location information to ship the compute task to a compute node 104a, 104b . . . 104n with locally attached storage 106a, 106b . . . 106n where the data associated with the compute task resides.

At 212, the file system manager 108 replicates each contiguous set of data blocks allocated to a compute node's 104a, 104b . . . 104n locally attached storage 106a, 106b . . . 106n to locally-attached storage 106a, 106b . . . 106n of at least one additional compute node 104a, 104b . . . 104n in the compute cluster 102. For example, data intensive applications need to be able to recover from failures in underlying commodity components. Accordingly, data intensive applications need to be able to recover and progress in the event of multiple node and disk failures which require data to be replicated across multiple nodes such that in the event of a node or disk failure, the computation can be restarted on a different node. In one embodiment, if a node with a compute operation has a failure, the compute operation is re-started on a second node where data associated with the compute operation is replicated.

The mechanism of replication may vary based on the file system and cluster components employed. In an exemplary embodiment, the file system uses a single source replication model, with the writer forwarding copies to all replicas. In another exemplary embodiment, the file system uses pipeline replication, where the out-bound bandwidth at the writer is not shared across multiple streams and writes data can be pipelined in sequence from a node to the next node in the pipeline while the data is being written in the node.

At 214, the file system manager 108 uses a single data block of shared storage subsystem 114 as the file system's block allocation granularity for striping data to be stored in the file system for a data access operation from a compute node 104a, 104b . . . 104n in the compute cluster 102. In one embodiment, the file system manager 108 uses a single data block of shared storage subsystem 114, small blocks, as the block allocation granularity for allocating data for traditional applications. In an exemplary embodiment, the file system manager 108 uses concurrent writers to the same file, enabling the sharing of write bandwidth across multiple nodes for traditional applications.

In an exemplary embodiment, the file system manager 108 uses a single data block of shared storage subsystem 114 for data access operations of traditional applications for effective cache management and to reduce the pre-fetch overhead because application records could span multiple blocks on different disks. For example, internal data access operations may include, but are not limited to, a book-keeping operation, a data transfer operation, a cache management operation, and a pre-fetching operation. Accordingly, the file system manager 108 uses small block granularity for disk accesses and pre-fetch operations that are optimized for traditional applications. At 216, the file system manager 108 allocates data for a data access operation from a compute node 104a, 104b . . . 104n to the shared storage subsystem 114.

At 218, the file system manager 108 tracks a location of each data block allocated to the shared storage subsystem 114 and to locally attached storage 106a, 106b . . . 106n for each compute node 104a, 104b . . . 104n in the compute cluster 102. In one embodiment, the file system manager 108 uses an allocation map to track location of data allocated to shared storage subsystem 114 and to locally attached storage 106a, 106b . . . 106n for each compute node 104a, 104b . . . 104n in the compute cluster 102. In one embodiment, the file system manager 108 provides each compute node 104a, 104b . . . 104n in the compute cluster 102 with access to the allocation map. For example, a compute node 104a, 104b . . . 104n uses the allocation map to determine a location of each block allocated to the shared storage subsystem 114 and to locally attached storage 106a, 106b . . . 106n.

In one embodiment, the allocation map is divided into a large number of lockable allocation regions, n regions for an n node compute cluster 102 to enable parallel updates to the allocation bit map. In an exemplary embodiment, each region in the allocation map contains the allocation status of 1/n-th of the disk blocks on every disk in the cluster file system 102 and at any given point-in-time every compute node 104a, 104b . . . 104n has ownership of x regions and tries to satisfy all the allocation requests using these regions. For example, the bitmap layout allows a file system to allocate disk space properly striped across all disks by accessing only a single allocation region at a time. Accordingly, lock conflicts are minimized because a compute node 104a, 104b . . . 104n can allocate space from different regions.

Figure 3:
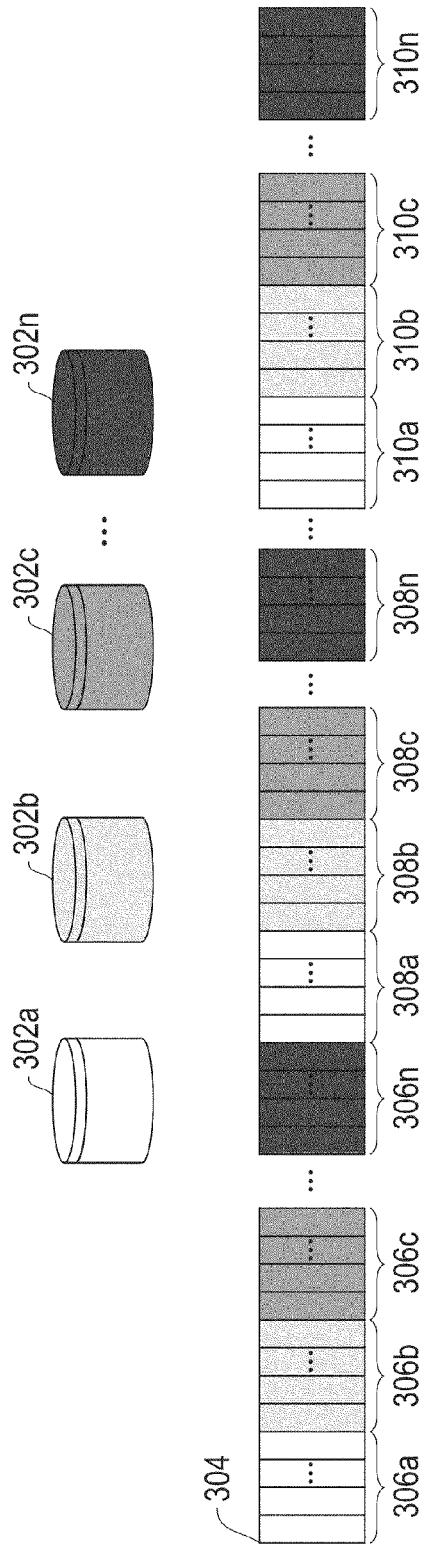
FIG. 3 illustrates a block allocation scheme for striping data to be stored in a file system for a compute operation in a compute cluster, according to one embodiment.

FIG. 3 illustrates a block allocation scheme for striping data to be stored in a file system for a compute operation in a compute cluster, according to one embodiment. In one embodiment, the block allocation scheme uses a contiguous set of blocks on a single storage disk of the locally attached storage 106a, 106b . . . 106n as the block allocation granularity for allocating data to be stored for a compute operation from a compute node 104a, 104b . . . 104 in the compute cluster 102.

A plurality of storage disks 302a, 302b . . . 302n of locally attached storage 106a, 106b . . . 104n are illustrated. A file 304 is divided into a plurality of fixed size data blocks. In an exemplary embodiment, the file 304 is divided into a plurality of 1 MB data blocks. The plurality of individual 1 MB data blocks are grouped into a plurality of contiguous data block sets. For example, 64 contiguous data blocks of 1 MB fixed size are grouped into a plurality of 64 MB data block sets for a 64 MB level of contiguity. Each individual 64 MB data block set is allocated to a single disk of locally attached storage 106a, 106b ... 106n in a round robin manner.

For example, the contiguous set of data blocks 306a are allocated to single storage disk 302a of locally attached storage 106a, 106b ... 106n. The contiguous set of data blocks 306a is allocated to single storage disk 302a of locally attached storage 106a, 106b ... 106n. The contiguous set of data blocks 306b is allocated to single storage disk 302b of locally attached storage 106a, 106b ... 106n. The contiguous set of data blocks 306c is allocated to single storage disk 302c of locally attached storage 106a, 106b ... 106n. The contiguous set of data blocks 306n is allocated to single storage disk 302n of locally attached storage 106a, 106b ... 106n.

The contiguous set of data blocks 308a is allocated to single storage disk 302a of locally attached storage 106a, 106b ... 106n. The contiguous set of data blocks 308b is allocated to single storage disk 302b of locally attached storage 106a, 106b ... 106n. The contiguous set of data blocks 306c is allocated to single storage disk 308c of locally attached storage 106a, 106b ... 106n. The contiguous set of data blocks 308n is allocated to single storage disk 302n of locally attached storage 106a, 106b ... 106n.

The contiguous set of data blocks 310a is allocated to single storage disk 302a of locally attached storage 106a, 106b ... 106n. The contiguous set of data blocks 310b is allocated to single storage disk 302b of locally attached storage 106a, 106b ... 106n. The contiguous set of data blocks 310c is allocated to single storage disk 302c of locally attached storage 106a, 106b ... 106n. The contiguous set of data blocks 306n is allocated to single storage disk 310n of locally attached storage 106a, 106b ... 106n.

Figure 4:
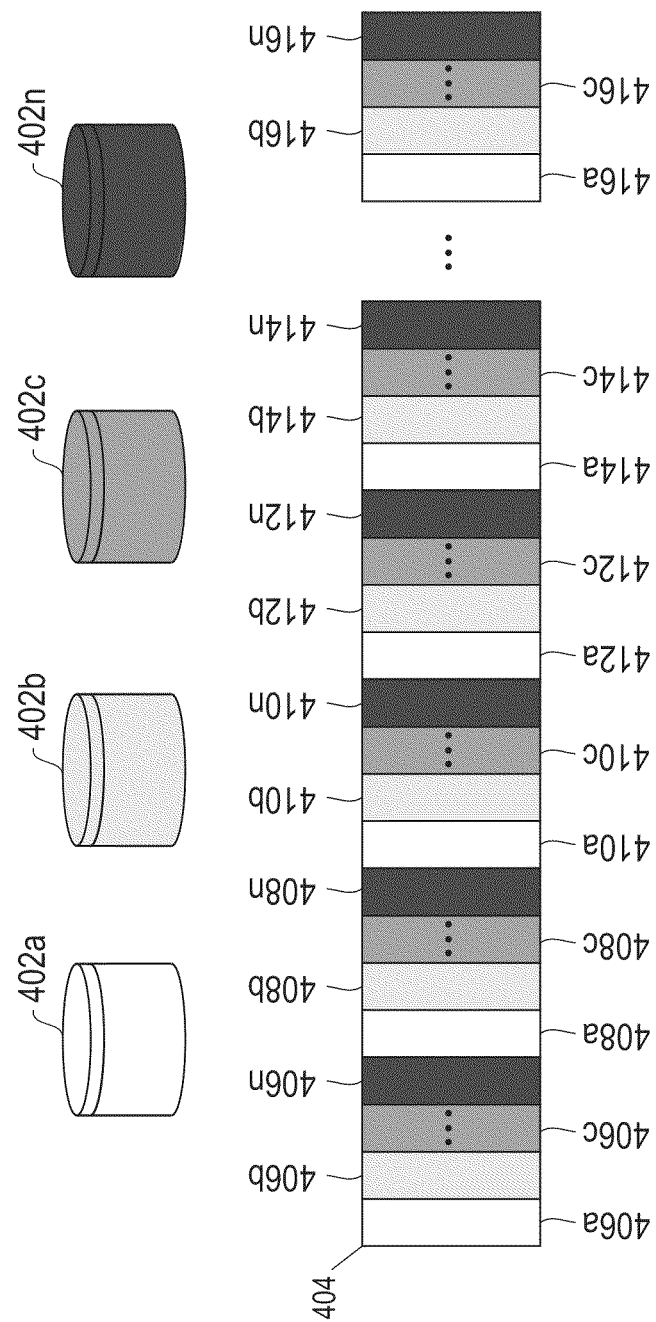
FIG. 4 illustrates a block allocation scheme for striping data to be stored in a file system for a data access operation in a compute cluster, according to one embodiment.

FIG. 4 illustrates a block allocation scheme for striping data to be stored in a file system for a data access operation in a compute cluster 102, according to one embodiment. In an exemplary embodiment, the file system manager 108 uses a single block on a single storage disk of shared storage subsystem 114 as the block allocation granularity for allocating data for data access operations used for traditional applications. For example, the data access operations include internal bookkeeping operations, data transfer operations, cache management operations, and pre-fetching operations optimized for traditional applications. A file 404 is divided into a plurality of fixed size data blocks. In an exemplary embodiment, the file 404 is divided into a plurality of 1 MB data blocks. Each individual 1 MB data block set is allocated to a single disk of shared storage subsystem 114 in a round robin manner.

For example, data block 406a is allocated to a single storage disk 402a of shared storage subsystem 114. Data block 406a is allocated to storage disk 402a, data block 406b is allocated to storage disk 402b, data block 406c is allocated to storage disk 402c, and data block 406n is allocated to storage disk 402n of shared storage subsystem 114. Data block 408a is allocated to storage disk 402a, data block 408b is allocated to storage disk 402b, data block 408c is allocated to storage disk 402c, and data block 408n is allocated to storage disk 402n of shared storage subsystem 114. Data block 410a is allocated to storage disk 402a, data block 410b is allocated to storage disk 402b, data block 410c is allocated to storage disk 402c, and data block 410n is allocated to storage disk 402n of shared storage subsystem 114.

Data block 412a is allocated to storage disk 402a, data block 412b is allocated to storage disk 402b, data block 412c is allocated to storage disk 402c, and data block 412n is allocated to storage disk 402n of shared storage subsystem 114. Data block 414a is allocated to storage disk 402a, data block 414b is allocated to storage disk 402b, data block 414c is allocated to storage disk 402c, and data block 414n is allocated to storage disk 402n of shared storage subsystem 114. Data block 416a is allocated to storage disk 402a, data block 416b is allocated to storage disk 402b, data block 416c is allocated to storage disk 402c, and data block 416n is allocated to storage disk 402n of shared storage subsystem 114.

Figure 5:
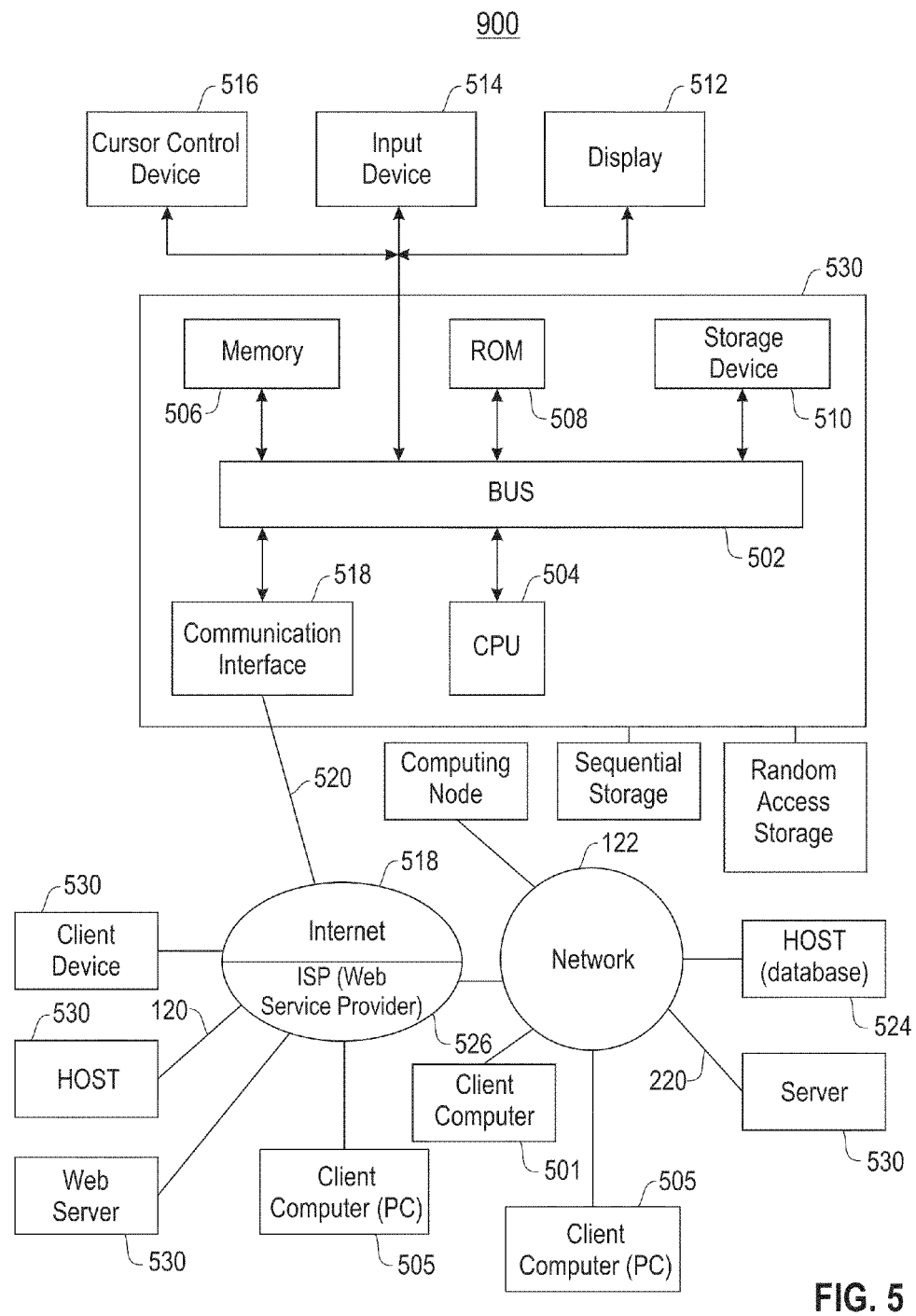
FIG. 5 illustrates a block diagram of a system in which a process for optimizing a file system for different types of applications in a compute cluster using dynamic block size granularity may be implemented, according to one embodiment.

FIG. 5 illustrates a block diagram of a system in which a process for optimizing a file system for different types of applications in a compute cluster using dynamic block size granularity may be implemented, according to one embodiment. The system 500 includes one or more client devices 501 connected to one or more server computing systems 530. A server 530 includes a bus 502 or other communication mechanisms for communicating information, and a processor (CPU) 504 coupled with the bus 502 for processing information. The server 530 also includes a main memory 506, such as a random access memory (RAM) or other dynamic storage device, coupled to the bus 502 for storing information and instructions to be executed by the processor 504. The main memory 506 also may be used for storing temporary variables or other intermediate information during execution or instructions to be executed by the processor 504.

The server computer system 530 further includes a read only memory (ROM) 508 or other static storage device coupled to the bus 502 for storing static information and instructions for the processor 504. A storage device 510, such as a magnetic disk or optical disk, is provided and coupled to the bus 502 for storing information and instructions. The bus 502 may contain, for example, thirty-two address lines for addressing video memory or main memory 506. The bus 502 can also include, for example, a 32-bit data bus for transferring data between and among the components, such as the CPU 504, the main memory 506, video memory and the storage 510. Alternatively, multiplex data/address lines may be used instead of separate data and address lines.

The server 530 may be coupled via the bus 502 to a display 512 for displaying information to a computer user. An input device 514, including alphanumeric and other keys, is coupled to the bus 502 for communicating information and command selections to the processor 504. Another type of user input device comprises cursor control 516, such as a mouse, a trackball, or cursor direction keys for communicating direction information and command selections to the processor 504 and for controlling cursor movement on the display 512.

The functions of the invention are performed by the server 530 in response to the processor 504 executing one or more sequences of one or more instructions contained in the main memory 506. Such instructions may be read into the main memory 506 from another computer-readable medium, such as the storage device 510. Execution of the sequences of instructions contained in the main memory 506 causes the processor 504 to perform the process steps described herein. One or more processors in a multi-processing arrangement may also be employed to execute the sequences of instructions contained in the main memory 506. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 504 for execution. For example, the instructions may initially be carried on a magnetic disk of a remote computer. The remote computer can load the instructions into its dynamic memory and send the instructions over a telephone line using a modem. A modem local to the server 530 can receive the data on the telephone line and use an infrared transmitter to convert the data to an infrared signal. An infrared detector coupled to the bus 502 can receive the data carried in the infrared signal and place the data on the bus 502. The bus 502 carries the data to the main memory 506, from which the processor 504 retrieves and executes the instructions. The instructions received from the main memory 506 may optionally be stored on the storage device 510 either before or after execution by the processor 504.

The server 530 also includes a communication interface 518 coupled to the bus 502. The communication interface 518 provides a two-way data communication coupling to a network link 520 that is connected to the world wide packet data communication network now commonly referred to as the Internet 528. The Internet 528 uses electrical, electromagnetic or optical signals that carry digital data streams. The signals through the various networks and the signals on the network link 520 and through the communication interface 518, which carry the digital data to and from the server 530, are exemplary forms of carrier waves transporting the information.

In another embodiment of the server 530, interface 518 is connected to a network 522 via a communication link 520. For example, the communication interface 518 may be an integrated services digital network (ISDN) card or a modem to provide a data communication connection to a corresponding type of telephone line, which can comprise part of the network link 520. As another example, the communication interface 518 may be a local area network (LAN) card to provide a data communication connection to a compatible LAN. Wireless links may also be implemented. In any such implementation, the communication interface 518 sends and receives electrical electromagnetic or optical signals that carry digital data streams representing various types of information.

The network link 520 typically provides data communication through one or more networks to other data devices. For example, the network link 520 may provide a connection through the local network 522 to a host computer 524 or to data equipment operated by an Internet Service Provider (ISP) 526. The ISP 526 in turn provides data communication services through the Internet 528. The local network 522 and the Internet 528 both use electrical, electromagnetic or optical signals that carry digital data streams. The signals through the various networks and the signals on the network link 120 and through the communication interface 518, which carry the digital data to and from the server 530, are exemplary forms or carrier waves transporting the information.

The server 530 can send/receive messages and data, including e-mail, program code, through the network, the network link 520 and the communication interface 518. Further, the communication interface 518 can comprise of a USB/Tuner and the network link 520 may be an antenna or cable for connecting the server 530 to a cable provider, satellite provider or other terrestrial transmission system for receiving messages, data and program code from another source.

The exemplary versions of the invention described herein may be implemented as logical operations in a distributed processing system such as the system 500 including the servers 530. The logical operations of the present invention can be implemented as a sequence of steps executing in the server 530, and, as interconnected machine modules, within the system 500. The implementation is a matter of choice and can depend on performance of the system 500 implementing the invention. As such, the logical operations constituting said example versions of the invention are referred to, for example, as operations, steps or modules.

Similar to a server 530 described above, a client device 501 can include a processor, memory, storage device, display, input device and communication interface (e.g., e-mail interface) for connecting the client device to the Internet 528, the ISP 526, or LAN 522, for communication with the servers 530.

The system 500 can further include computers (e.g., personal computers, computing nodes) 505 operating in the same manner as client devices 501, wherein a user can utilize one or more computers 505 to manage data in the server 530.

Generally, the term "computer-readable medium", as used herein, refers to any medium that participated in providing instructions to the processor 504 for execution. Such a medium may take many forms, including but not limited to, non-volatile media, volatile media and transmission media. Non-volatile media includes, for example, optical or magnetic disks, such as the storage device 510. Volatile media includes dynamic memory, such as the main memory 506. Transmission media includes coaxial cables, copper wire and fiber optics, including the wires that comprise the bus 502.

Thus, optimizing a file system for different types of applications in a compute cluster using dynamic block size granularity is disclosed. As will be appreciated by one skilled in the art, aspects of the present invention may be embodied as a system, method or computer program product. An aspect of the invention includes a computer program product for optimizing a file system for different types of applications in a compute cluster using dynamic block size granularity. The computer program product includes a computer readable storage medium having computer readable program code embodied therewith.

The computer readable storage medium includes computer readable program code configured to reserving a predetermined number of storage allocation regions for each node in a cluster, wherein each storage allocation region comprises a set of contiguous data blocks on a single storage disk of locally attached storage. The computer readable storage medium further includes computer readable program code configured to use a contiguous set of data blocks on a single storage disk of locally attached storage as a file system's block allocation granularity for striping data to be stored in the file system for a compute operation in the cluster. The computer readable storage medium further includes computer readable program code configured to use a single data block of a shared storage subsystem as the file system's block allocation granularity for striping data to be stored in the file system for a data access operation in the cluster.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a wide area network WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What we claim is:

1. A method of using a dynamic storage data block size granularity in a computing cluster with a clustered file system for serving applications that initiate data access operations and applications that initiate compute operations, the computing cluster having a shared storage system and compute servers with locally attached storage, the method comprising:

prefetching a predetermined number of storage allocation regions for each compute server in said cluster, each storage allocation region being a set of contiguous data blocks on a single storage disk of locally attached storage to a compute server, and further prefetching at least one additional storage allocation region until the aggregate number of reserved storage allocations regions for a compute server is equal to the predetermined number if an aggregate number of the reserved storage allocation regions for the compute server in said cluster is less than the predetermined number;

allocating data for a compute operation to at least one of the reserved storage allocation regions, said allocating includes using a contiguous set of data blocks on a single storage disk of locally attached storage as the clustered file system's block allocation granularity for striping data to be stored by said clustered file system for a compute operation in the cluster;

allocating data for a data access operation to said shared storage system, said allocating data for a data access operation includes using a single data block of said shared storage system as the clustered file system's block allocation granularity for striping data to be stored in the clustered file system for a data access operation in the cluster;

sending a compute operation to be served by said clustered file system to a compute server having data for the compute operation allocated to compute server's locally attached storage such that the compute operation and the data for the compute operation are co-located on the compute server.

2. The method of claim 1, further comprising replicating each contiguous set of data blocks allocated to a compute server's locally attached storage to a second compute server's locally attached storage in said cluster.

3. The method of claim 1, further comprising tracking a location of each data block stored by said file system to said storage system and to locally attached storage of the compute servers.

4. The method of claim 1, wherein the data access operation is a file system operation selected from the group consisting of a bookkeeping operation, a data transfer operation, a cache management operation, and a pre-fetching operation.

5. The method of claim 1, wherein said cluster hosts computing services for one or more remote clients in a cloud computing environment.

6. The method of claim 5, wherein the applications that initiate compute operations include data analytics applications.

7. The method of claim 1, wherein said block size granularity of a single block is a size in the range of 256 KB and 512 KB.

8. The method of claim 1, further comprising:
restarting the compute operation on a second compute server where data associated with the compute operation is replicated from the compute server if the compute server serving the compute operation has a failure.

9. A computing cluster using a dynamic storage block size granularity for serving applications that initiate data access operations and applications that initiate compute operations, said cluster comprising:
a shared storage system;
compute servers that serve file system compute operations and having locally attached; and a file system manager of said file system, said manager:
prefetches a predetermined number of storage allocation regions for each compute server in said cluster, each storage allocation region being a set of contiguous data blocks on a single storage disk of locally attached storage to a compute server, and further prefetches at least one additional storage allocation region until the aggregate number of reserved storage allocations regions for a compute server is equal to the predetermined number if an aggregate number of the reserved storage allocation regions for the compute server in said cluster is less than the predetermined number, allocates data for a compute operation to at least one of the reserved storage allocation regions, said allocating includes using a contiguous set of data blocks on a single storage disk of locally attached storage as said file system's block allocation granularity for striping data to be stored by said file system for a compute operation in the cluster, allocates data for a data access operation to said shared storage system, said allocating data for a data access operation includes using a single data block of said shared storage system as the file system's block allocation granularity for striping data to be stored in the file system for a data access operation in the cluster, and sends a compute operation to be served by said file system to a compute server having data for the compute operation allocated to compute server's locally attached storage such that the compute operation and the data for the compute operation are co-located on the compute server.

10. The computing cluster of claim 9, wherein said manager: replicates each contiguous set of data blocks allocated from a compute server's locally attached storage to a second compute server's locally attached storage in said cluster.

11. The computing cluster of claim 9, wherein said cluster hosts computing services for one or more remote clients in a cloud computing environment.

12. The computing cluster of claim 11, wherein the applications that initiate compute operations include data analytics applications.

13. The computing cluster of claim 9, wherein said block size granularity of a single block is a size in the range of 256 KB and 512 KB.

14. The computing cluster of claim 9, wherein said manager restarts the compute operation on a second compute server where data associated with the compute operation is replicated from the compute server if the compute server serving the compute operation has a failure.

15. A computer program product of using a dynamic storage data block size granularity in a computing cluster with a clustered file system for serving applications that initiate data access operations and applications that initiate compute operations, the computing cluster having a shared storage system and compute servers with locally attached storage, said program product comprising a non-transitory computer readable storage medium having computer readable program code embodied therewith, said program code being executable by a computer to:

prefetch a predetermined number of storage allocation regions for each compute server in said cluster, each storage allocation region being a set of contiguous data blocks on a single storage disk of locally attached storage to a compute server, and further prefetches at least one additional storage allocation region until the aggregate number of reserved storage allocations regions for a compute server is equal to the predetermined number if an aggregate number of the reserved storage allocation regions for the compute server in said cluster is less than the predetermined number;

allocate data for a compute operation to at least one of the reserved storage allocation regions, said allocating includes using a contiguous set of data blocks on a single storage disk of locally attached storage as said clustered file system's block allocation granularity for striping data to be stored by said clustered file system for a compute operation in the cluster;

allocate data for a data access operation to said shared storage system, said allocating data for a data access operation includes using a single data block of said shared storage system as the clustered file system's block allocation granularity for striping data to be stored in the clustered file system for a data access operation in the cluster, and sends a compute operation to be served by said file system to a compute server having data for the compute operation allocated to compute server's locally attached storage such that the compute operation and the data for the compute operation are co-located on the compute server.

16. The computer program product of claim 15, said program code being further executable by a computer to track a location of each data block stored by said storage system and to locally attached storage of compute servers.

17. The computer program product of claim 15, said program code being further executable by a computer to replicate each contiguous set of data blocks allocated from a compute server's locally attached storage to a second compute server's locally attached storage in said cluster.

18. The computer program product of claim 15, wherein said cluster hosts computing services for one or more remote clients in a cloud computing environment and the applications that initiate compute operations include data analytics applications.

19. The computer program product of claim 15, wherein said block size granularity of a single block is a size in the range of 256 KB and 512 KB.

20. The computer program product of claim 7, wherein said manager restarts the compute operation on a second compute server where data associated with the compute operation is replicated from the compute server if the compute server serving the compute operation has a failure.

* * * * *